United States Patent [19]
Colford

[11] Patent Number: 4,858,896
[45] Date of Patent: Aug. 22, 1989

[54] ELASTOMERIC MOUNTING

[75] Inventor: Terence H. Colford, Queniborough, England

[73] Assignee: Dunlop Limited a British Company, London, England

[21] Appl. No.: 97,148

[22] Filed: Sep. 16, 1987

[30] Foreign Application Priority Data

Sep. 19, 1986 [GB] United Kingdom ................ 8622638

[51] Int. Cl.$^4$ ............................................... F16F 9/08
[52] U.S. Cl. .................................. 267/140.1; 267/219
[58] Field of Search ............... 248/562; 267/219, 220, 267/140.1, 121, 141.1, 141.2

[56] References Cited

U.S. PATENT DOCUMENTS

| | | | |
|---|---|---|---|
| 3,944,007 | 3/1976 | Pelat | 267/140.1 |
| 4,199,128 | 4/1980 | van den Boom et al. | 267/140.1 X |
| 4,432,537 | 2/1984 | Pletsch. | |
| 4,572,490 | 2/1986 | Alciati | 267/140.1 |
| 4,623,135 | 11/1986 | Ray | 267/140.1 |
| 4,630,803 | 12/1986 | Werner et al. | 267/140.1 |
| 4,741,521 | 5/1988 | Schiffner et al. | 267/141.2 X |

FOREIGN PATENT DOCUMENTS 7709267 8/1977 Fed. Rep. of Germany.

Primary Examiner—Duane A. Reger
Attorney, Agent, or Firm—Stevens, Davis, Miller & Mosher

[57] ABSTRACT

An elastomeric mounting suitable for providing a low frequency suspension for a road vehicle cab comprises an annular elastomeric diaphragm shaped to deform by both bending and shear over a normal working range to accommodate relative longitudinal movement between two members between which the diaphragm is located. A fluid chamber is defined by an annular space between two tubular rigid members and bonded axially by the elastomeric diaphragm and an annular seal. Fluid damping is provided in the fluid chamber, preferably by orifices contained within a buffer which restrains relative radial movement of the rigid members.

15 Claims, 3 Drawing Sheets

ELASTOMERIC MOUNTING

This invention relates to an elastomeric mounting and in particular, though not exclusively, to an elastomeric mounting suitable for use in providing a low frequency suspension for a vehicle cab.

A vehicle cab suspension, especially a road vehicle cab suspension, usually is required, for operator comfort, to exhibit low frequency and low stiffness characteristics over a wide range of dynamic deflections under normal cab loading conditions. Elastomeric material commonly is used in seeking to meet this requirement and it is known to provide a vehicle cab suspension comprising a pair of tubular metal members arranged coaxially one within the other and interconnected by an annular element of elastomeric material bonded to the tubular members. The annular elastomeric element is oriented such that the normal load of the cab acts in a direction parallel with the longitudinal axis of the tubular members and in consequence vertical movement of the cab relative to the vehicle body is accommodated by shear deflection of the elastomeric material. While the resulting suspension can provide a satisfactory performance it suffers the disadvantage of needing to be of large dimensions in order to allow for the magnitude of shear deflection necessary to accommodate the desired large range of dynamic deflection under normal cab loading conditions.

The present invention seeks to provide for use in a vehicle cab suspension a mounting of more compact construction than hitherto known.

In accordance with the present invention an elastomeric mounting comprises a pair of rigid members arranged to define an annular space therebetween, an annular element of elastomeric material located in said annular space and arranged to extend between and serve to interconnect said rigid members, the annular element of elastomeric material being of a shape which deforms by both shear and bending movements in the event of relative longitudinal movement of the rigid members, and the elastomeric mounting additionally comprising integral damping means arranged to provide a damping effect additional to that provided by the annular element of elastomeric material during relative longitudinal movement of the rigid members.

The annular element of elastomeric material preferably is bonded to each of the rigid members and more preferably is shaped and arranged such that when load is applied in said longitudinal direction the annular elastomeric element deforms from an initially unstressed condition by buckling and shear movement to exhibit a regressive stiffness characteristic.

Preferably an annular elastomeric buffer bush or like elastomeric transverse load bearing element is provided and arranged to resist relative movement of the rigid members in transverse directions perpendicular to the direction of the aforementioned relative longitudinal movement. Preferably it is located between the rigid members and secured to one only of the rigid members. It may be secured by bonding or as a friction fit. The buffer bush may be in the form of an annular body of elastomeric material which incorporates an annular reinforcement layer of substantially inextensible material thereby to permit the bush to be secured to a rigid member as a friction fit by virtue of compression of elastomeric material of the bush lying between the reinforcement layer and said rigid member.

The damping means preferably is a fluid damping means comprising a fluid-filled annular chamber defined in part by the above-referred inner and outer rigid members and additionally by an annular seal which is spaced from said annular element and extends between and is sealed to said rigid members. Preferably the annular chamber is filled with a substantially incompressible fluid and damping is achieved by movement of a restrictor through the fluid during relative longitudinal movement of the rigid members.

The restrictor may be comprised by buffer means secured to one of the confronting surfaces of the inner and outer rigid members for restricting relative radial movement of the rigid members. In one preferred construction an annular buffer means is provided with a or a series of circumferentially spaced orifices for the restricted flow of fluid therethrough. Particularly in constructions in which the buffer means is provided with an orifice for fluid flow therethrough the buffer means may be arranged normally to slide in fluid sealing engagement over one of the inner and outer rigid members. In another embodiment an orifice may be defined by one or more spaces between a periphery of annular buffer means and one of the confronting surfaces of the inner and outer rigid members relative to which the buffer means moves during the aforementioned relative longitudinal movement.

The annular element of elastomeric material preferably comprises between its inner and outer peripheries an annular section the thickness of which, as considered in the longitudinal direction, is less than the thickness of the element, in said direction, at least one of the inner and outer peripheral regions.

Preferably, as considered in a longitudinal cross-sectional plane, the minimum thickness of the annular element in said longitudinal direction is less than one half and more preferably less than or equal to one third of the thickness of the element as considered in a direction transverse of the longitudinal direction.

It is further preferred that the surfaces of the rigid members to which the annular element of elastomeric material is secured, e.g. by bonding, be offset in the longitudinal direction when the mounting is in an unstressed condition.

Particularly suitable shapes for the annular element of elastomeric material for providing a regressive stiffness characteristic include shapes in which one of the longitudinally facing surfaces is of a substantially C-shape in cross-section.

The above and other features of the invention will now be described, by way of example, with reference to the accompanying drawings in which.

Figure 1:
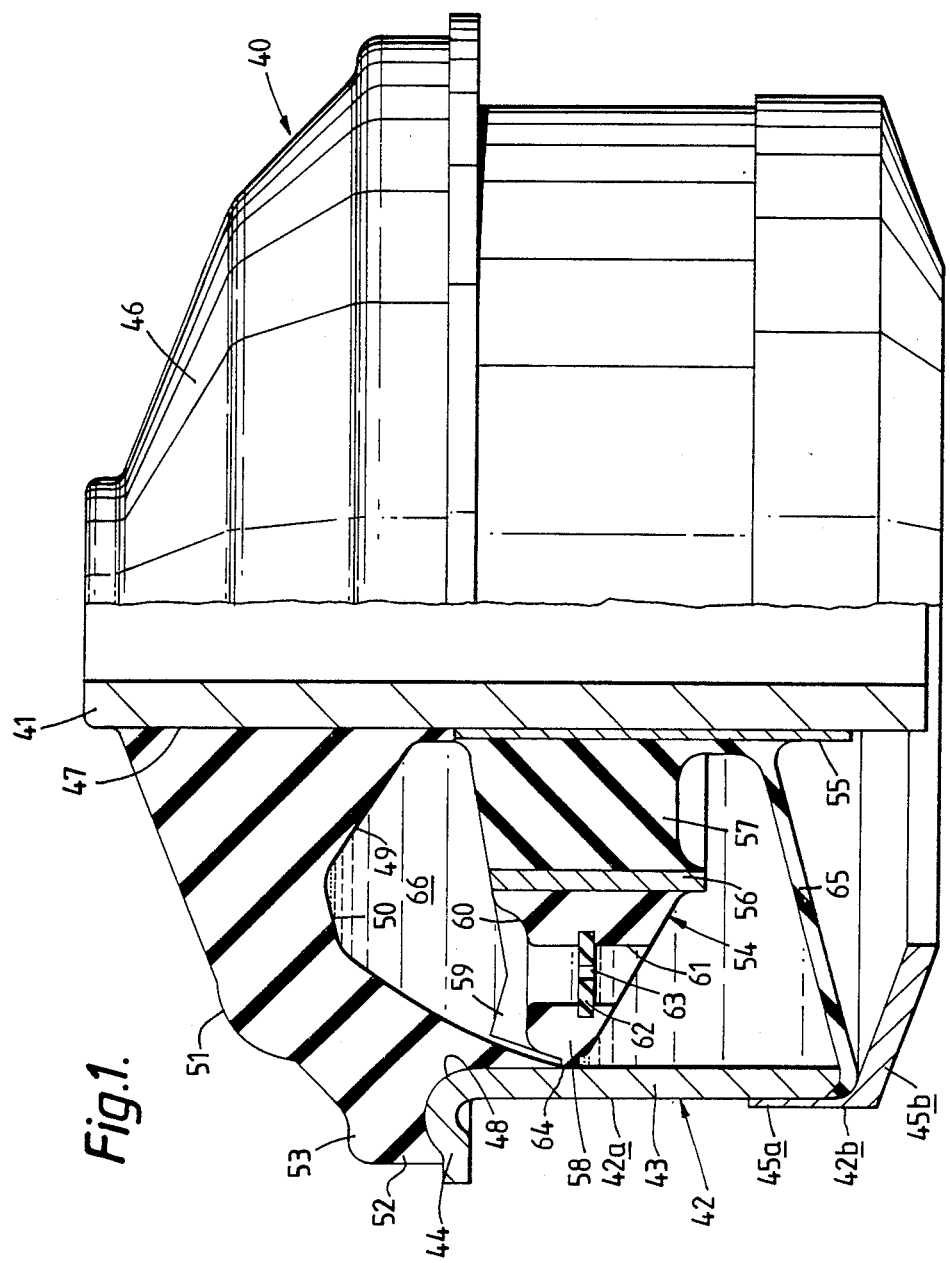
FIG. 1 is a longitudinal sectional view of an integrally damped elastomeric mounting of the present invention when in an unstressed condition.
Figure 2:
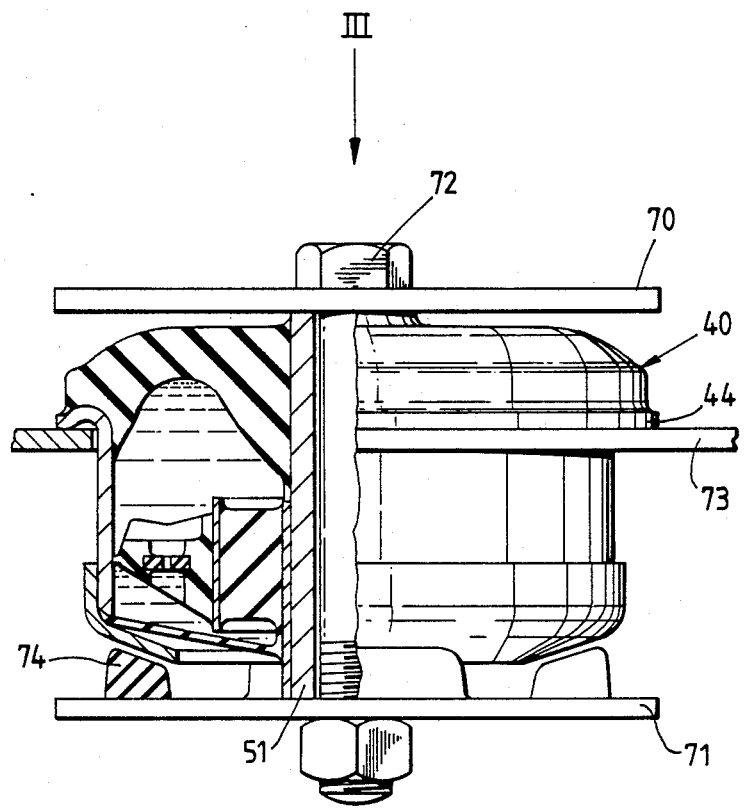
FIG. 2 is a longitudinal sectional view of the mounting of FIG. 1 shown in situ with part of a vehicle cab and body structure and in a fully deflected condition.
Figure 3:
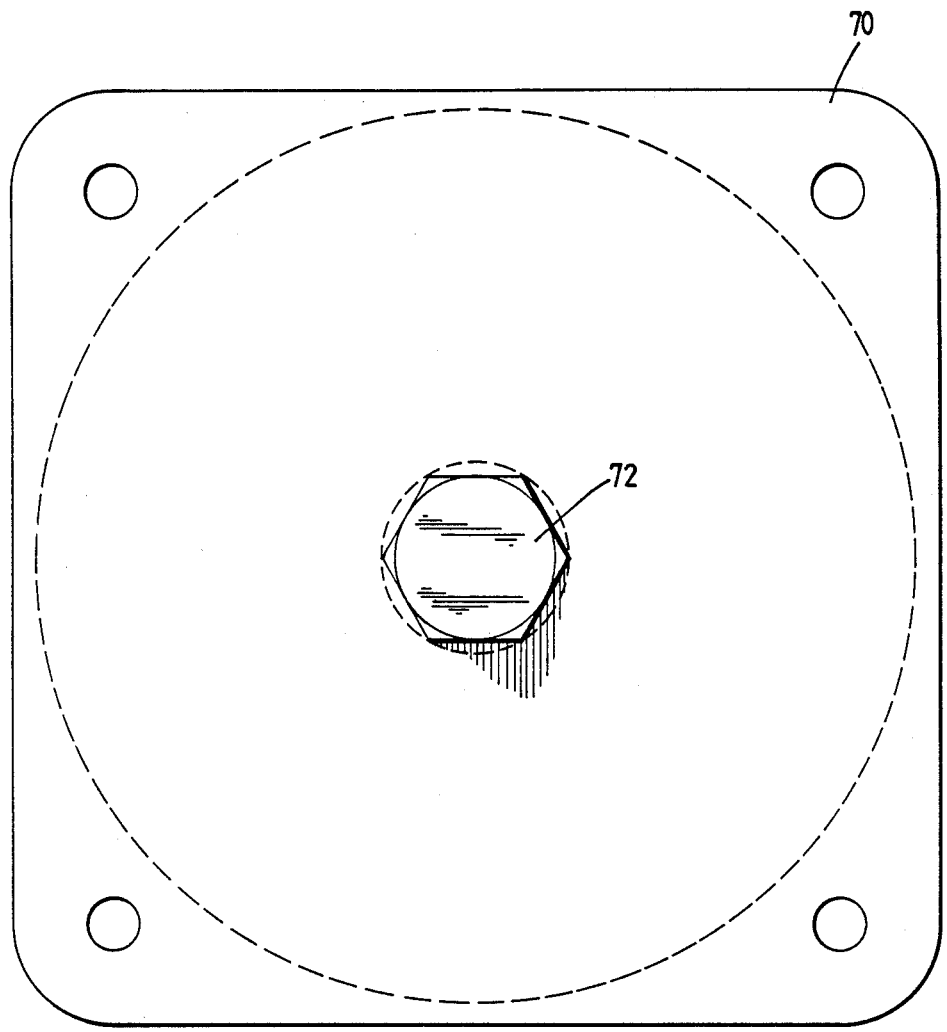
FIG. 3 is an end view in the direction of arrow III of FIG. 2.

In the embodiment of the present invention shown in FIGS. 1 to 3 an elastomeric mounting 40 for a vehicle cab suspension comprises an inner cylindrical metal tube 41 and an outer metal tube 42 which surrounds and is spaced from the inner tube over part of the length of the inner tube.

The outer tube 42 is of a two-part spun or pressed metal construction. One part 42a comprises a cylindrical shaped portion 43 from an upper end of which, as viewed in FIG. 1, extends a radially outwardly directed flange 44. The other part 42b has a cylindrical portion 45a for surrounding a lower end of the cylindrical portion 43 of the first part 42a and a frusto-conical shaped abutment flange 45b extends radially inwardly and downwardly from a lower end of the portion 45a.

The tubes 41, 42 are interconnected by an annular load-bearing rubber diaphragm 46 typically formed of non-reinforced natural rubber. A radially inner surface 47 of the diaphragm is bonded to the inner tube 41 and a radially outer region 48 is bonded to the flange 44 and neighbouring upper end of the cylindrical portion 43 of the outer tube 42.

The thickness of the diaphragm in the longitudinal (vertical) direction of FIG. 1 at the point of minimum thickness of the diaphragm in said direction is substantially equal to one third of the radial thickness of the diaphragm as considered between the confronting surfaces of the tubes 41, 42.

The diaphragm 46 is of a shape which results in it experiencing both buckling and shear deformation when subject to an applied load which causes the inner tube to move downwardly relative to the outer tube, i.e. from the relative orientation of FIG. 1 to that of FIG. 2. Associated with the buckling and shear deformation is a regressive load-deflection (i.e. stiffness) characteristic. That is, under increasing applied load from a condition of zero applied load the stiffness decreases, but later increases as the diaphragm and its integral buffer 53 (described in more detail below) make contact with a top overload plate 70 (see FIG. 2).

To assist in achieving a suitable buckling and shear deformation characteristic the diaphragm 46 is generally C-shaped in half cross-section as viewed in FIGS. 1 and 2. The downwardly facing surface 49 of the diaphragm is of a concave shape in cross-section and a central portion 50 of the surface 49 lies vertically above the outwardly extending flange 44 at least in the unstressed condition shown in FIG. 1. It is preferred also, as shown in FIG. 1, that the bonded radially inner surface 47 does not extend below the level of the outwardly extending flange 44, the tube surfaces to which the diaphragm is bonded thus being offset in the vertical, longitudinal direction when in an unloaded condition as shown in FIG. 1.

Although the diaphragm is of generally C-shape in half cross-section it is not essential that its upper and lower surfaces each be of a C-shape.

The radially outer region 52 of the upper surface 51 of the diaphragm 46 is formed integrally with an enlarged longitudinally thickened buffer portion 53 for a purpose which will be described in more detail below.

To provide a suitable radial compliance characteristic a buffer bush 54 is mounted on the inner tube 41. The bush 54 comprises an inner metal support ring 55 and an outer reinforcing ring 56. An annular element 57 of natural rubber is bonded to the rings. Radially outwards of the ring 56 is an annular natural rubber band 58 bonded to the ring 56 and formed in its upper surface 59 with a series of four uniformly circumferentially spaced pockets 60. In the base of each pocket 60 there is formed a through bore the longitudinal axis of which is parallel with the longitudinal axes of the inner and outer rigid members. A rigid disc 62 having a central orifice 63 is provided in each through bore. The radially outermost region of the band 58 defines an annular lip seal 65 for fluid-tight sliding movement over the inner surface of cylindrical portion 43 of the outer tube 42 during normal use of the mounting (i.e. in the absence of high radial load).

A thin flexible reinforced diaphragm seal 65 is formed integrally with the annular element 57 of the buffer bush 54 and extends between the rigid members to assist in providing a fluid-tight seal therebetween. A radially outer part of the diaphragm seal 65 is located in and secured by compression on assembly to an annular crevice defined by a lower end surface of the portion 45a of the outer tube 42a and an inwardly facing surface of the outer tube part 42b. A radially inner part of the diaphragm seal extends from a thin cylindrical downwardly extending portion of the element 57, the downwardly extending portion being bonded to the inner support ring 55. The upper end of the inner support ring is bonded to the load bearing diaphragm 46.

The outer rigid member 42, inner rigid member 41 supporting the inner ring 51, annular load bearing diaphragm 46 and diaphragm seal 65 define an annular chamber 66 which is wholly fitted with oil or other incompressible fluid.

FIG. 2 shows the elastomeric mounting 40 of FIG. 1 secured to vehicle body structure plates 70, 71 by means of a bolt 72 extending through the inner tube 51 and to a vehicle cab structure 73 by means of bolts (not shown) extending through the outer flange 44.

An annular buffer ring 74 is attached to an upper surface of the lower body structure plate 71 to confront the frusto-conical shaped abutment flange 45 and thereby provide resistance to rebound movement of the mounting.

The mounting 40 is designed in relation to the intended applied load such that under normal static load conditions the lip seal 64 lies substantially mid-way between the ends of the inner surface of the outer member 42 over which it slides in sealing contact (in the absence of high radial load). When the mounting is subject to dynamic conditions causing relative movement of the inner and outer members the incompressible fluid will be urged to flow through the orifices 63 and thereby provide a damping effect additional to the resiliency of the load bearing diaphragm 46.

High vertical deflection of the inner tube downwards relative to the outer tube is resisted by increasing stiffness of the annular load bearing diaphragm and subsequently the effect of the bump buffer 53. The relative movement of the inner and outer tubes is damped by the effect of fluid flow through the orifice 63, hysteretic damping of the diaphragm 46 and friction between the seal 64 and outer tube 42. Any rebound movement arising in spite of the damping effect is resisted by the increasing stiffness of the load bearing diaphragm 46 and the effect of the buffer ring 74 as shown in the fully deflected rebound condition of FIG. 2.

The load bearing diaphragm need not have the longitudinal cross-sectional shape shown in FIG. 1; it may be of an alternative cross-sectional shape such as one of the shapes shown in FIGS. 4(a) to 4(c) of the specification of our co-pending GB Patent Application No. 8718447. In general, for a more regressive load-deflection curve the bending deformation experienced by the diaphragm is more significant, and the degree of bending deformation is a function of the ratio of the thickness of the diaphragm in the longitudinal direction and the thickness in a transverse direction.

What I claim is:

1. An elastomeric mounting comprising a pair of rigid members arranged to define an annular space therebetween,
   an annular first element of elastomeric material located in said annular space and arranged to extend between and serve to interconnect said rigid members,
   a second element of elastomeric material also arranged to extend between and be sealed to each of said rigid members to form therebetween a flexible annular diaphragm seal,
   said annular first element of elastomeric material being of a shape which deforms by both shear and bending movements in the event of relative longitudinal movement of the rigid members and only said first of said first and second elements of elastomeric material being shaped to deform from an initially unstressed condition in response to applied load in said direction of relative longitudinal movement by a combination of buckling and shear movements to exhibit a regressive stiffness characteristic,
   said first and second elements of elastomeric material being spaced apart by said rigid members in said direction of relative longitudinal movement of the rigid members to cooperate with said rigid members to define therebetween an annular fluid chamber,
   a substantially incompressible fluid contained in said annular fluid chamber,
   an annular elastomeric buffer means contained in said annular fluid chamber and secured to one of the confronting surfaces of the inner and outer rigid members for restricting relative radial movement of the rigid members, said annular elastomeric buffer means incorporating an annular reinforcement layer of substantially inextensible material and being arranged to slide in fluid sealing engagement over the other of said confronting surfaces of the inner and outer rigid members, and
   a fluid restrictor arranged to permit a restricted flow of fluid within the fluid chamber between opposite sides of the buffer means during relative longitudinal movement of the rigid members thereby to provide a damping effect additional to that provided by said first element of elastomeric material during relative longitudinal movement of the rigid members.

2. An elastomeric mounting according to claim 1 wherein said restrictor is comprised by said buffer means.

3. An elastomeric mounting according to claim 2 wherein said buffer means is provided with at least one series of circumferentially spaced orifices for restrictive flow of fluid therethrough.

4. An elastomeric mounting according to claim 2 wherein an orifice for restricted flow of fluid therethrough is defined by a space between a periphery of said buffer means and one of said confronting surfaces of the inner and outer rigid members.

5. An elastomeric mounting according to claim 2 wherein the elastomeric buffer means is comprised at least in part by elastomeric material of said first element of elastomeric material.

6. An elastomeric mounting according to claim 2 wherein said annular reinforcement layer of the buffer means is arranged to maintain under residual compression elastomeric material of the buffer means between said reinforcing ring and a first one of said rigid members thereby at least to assist in securing said buffer means to said first of the rigid members.

7. An elastomeric mounting according to claim 1 wherein said annular first element of elastomeric material is bonded to each of the rigid members.

8. An elastomeric mounting according to claim 1 wherein said annular first element of elastomeric material comprises between its inner and outer peripheries an annular section the thickness of which, as considered in said longitudinal direction, is less than the thickness of the element, in said direction, at at least one of the inner and outer peripheral regions.

9. An elastomeric mounting according to claim 1 wherein, as considered in a cross-sectional plane containing the longitudinal axis of the mounting, the minimum thickness of said annular first element in the longitudinal direction is less than one half of the thickness of the element as considered in a direction transverse to the longitudinal axis.

10. An elastomeric mounting according to claim 9 wherein said minimum thickness in the longitudinal direction is no greater than one third of the thickness of the element in said transverse direction.

11. An elastomeric mounting according to claim 1 wherein said annular first element of elastomeric material is bonded to each of said rigid members at surface positions of the respective members which are longitudinally offset when the elastomeric mounting is in an unstressed condition.

12. An elastomeric mounting according to claim 1 and comprising elastomeric axial buffer means operable at relative longitudinal positions of the rigid members other than those relative positions lying within a normal working range of the mounting to provide outside of said range a greater resistance to relative longitudinal movement than that provided by said annular first element of elastomeric material within said working range.

13. An elastomeric mounting according to claim 1, wherein the inner rigid member extends through said second element of elastomeric material.

14. An elastomeric mounting according to claim 13, wherein a portion of the inner rigid member lying external of the annular chamber and at a position spaced from said annular first element by said second element of elastomeric material provides support for an elastomeric axial buffer means operable at relative longitudinal positions of the rigid members other than those relative positions lying within a normal working range of the mounting to provide outside of said range a greater resistance to relative longitudinal movement than that provided by said annular first element of elastomeric material within said working range.

15. An elastomeric mounting according to claim 13, wherein the inner rigid member comprises a rigid tube through which bolt extends.

* * * * *